March 21, 1933.  W. BÄRK  1,901,946
TREE PLANER FOR CUTTING OR WORKING OUT RESIN PASSAGES IN TREES
Filed Nov. 22, 1930
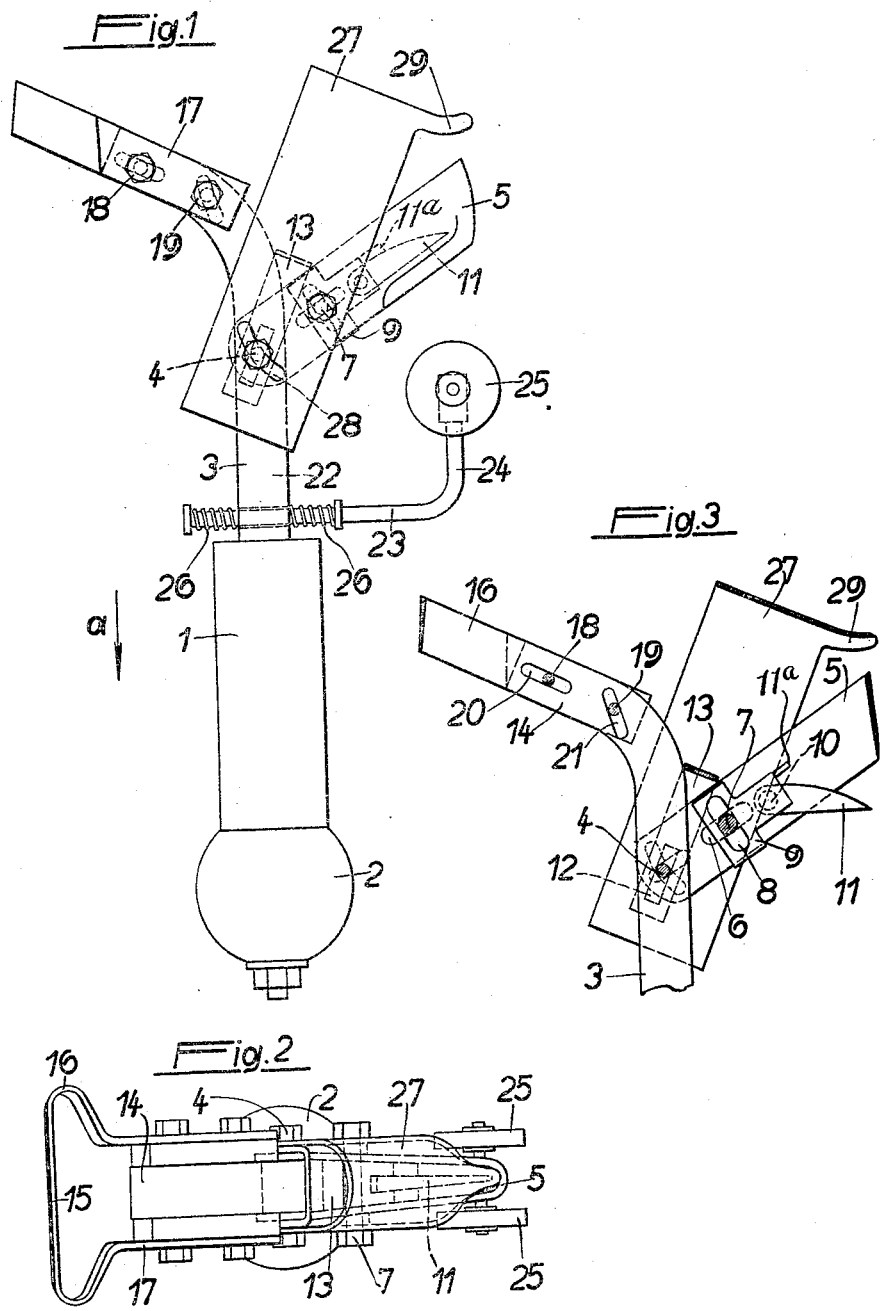
WALTER BÄRK
INVENTOR;
his Attorney Patented Mar. 21, 1933

1,901,946

UNITED STATES PATENT OFFICE

WALTER BARK, OF ANNABURG, GERMANY

TREE-PLANER FOR CUTTING OR WORKING OUT RESIN-PASSAGES IN TREES

Application filed November 22, 1930, Serial No. 497,518, and in Austria November 23, 1929.

This invention relates to improvements in tree-planers for cutting or working out resin-passages in trees and more particularly relates to that kind of tree-planters in which a U-shaped plane-iron with adjustable cutting depth is adjustably mounted with respect to the grip.

This invention has for its object to avoid the drawbacks of the known tools of this kind, namely small productiveness, non-uniform sap-faces and troublesome handling, difficult working and troublesome maintenance.

The object of the present invention is attained in that the plane-iron encloses a universally adjustable tongue, the thickness of the chips depending on the adjustment of said tongue and a uniform sap-face being formed with the result of the best productiveness. At each lateral end of its cutting edge, the peeling tool arranged on the same stem is provided with a curved part of a small radius corresponding to the cross-sectional area of the grooves, passages or the like, in order to retouch or subsequently improve the grooves, passages or the like worked out or cut by means of the plane-iron.

The tool constructed according to the present invention serves for working out resin-passages in the tree by drawing it downwards or by moving or pushing upward. In order to perform the work last mentioned, the handle of the tool is provided with a rest for the hand, which is adapted to be set and fixed at any convenient angle and preferably is U-shaped, as well as enclosing the handle with its tool-parts.

One mode of carrying out the present invention is illustrated by way of example on the accompanying sheet of drawing in which:—

Figs. 1 and 2 illustrate a tree-planer in side view and in plan view respectively.

Fig. 3 is a part-sectional view of the plane-iron with outward turned tongue.

A shaft 3 is secured to a handle 1 of any convenient material which, in known manner, is provided with a knob 2 of lead or the like. A U-shaped plane-iron 5 is rotatably mounted on the shaft 3 by means of a screw-bolt 4. As shown in Fig. 2, the arms of the plane-iron are inclined with respect to each other and thus form a rearwardly tapering profile in order to provide for a clean cut of the grooves and passages worked out by the plane-cutter and prevent any jamming during the operation. As shown in Fig. 3, a screw 7 is mounted in a longitudinal slot 6 of the plane-iron 5 and passes through a slot 8 of a substantially universally adjustable carrier 9 to which is pivotally secured a tongue 11 by means of a bolt 10 in such a manner, that it can be turned outward, the carrier being provided with a stop 11ª to lock the rear end of the tongue in working position. On loosening the screw 7, in view of the right angle arrangement of both slots 6 and 8, the tongue can be set at any desired angle with respect to the cutting edge of the plane-iron according to the desired cutting-depth and thus the thickness of the chips can be controlled. The cutting edge of the plane-iron is accessible and can be sharpened if the tongue 11 is turned outward into the position shown in Fig. 3.

A U-shaped bracket 13 is rotatably mounted on the screw-bolt 4 of the shaft 3 and slidable in a longitudinal slot 12, in order to set the cutting edge of the plane-iron in most favorable working position. The outer ends of said bracket 13 can be adjusted at a convenient distance from the screw-bolt 4 by adjustment in the longitudinal slot 12, so that the plane-iron 5 rests on the bracket 13 at a convenient angle with respect to the shaft 3, the bracket 13 resting on the said stem.

A peeling tool 15 is arranged at the rearwardly turned top end 14 of the shaft 3, the cutting edge being longer than corresponds to the width of the stem 14. Each side of the said cutting edge is in the shape of a curved part 16 of a small radius. These curved cutting edges serve for working out or improving the resin-passages cut with the plane-iron 5. In the illustrated construction, the legs 17 of the peeling tool 15 are fixed to the stem 14 by means of screws 18 and 19, which pass through longitudinal slots 20 and 21, disposed at an angle with respect to each other.

When the screws 18 and 19 are loosened it is possible to set the peeling tool 15 in any convenient position and secure it in this position by tightening the screws 18 and 19.

In order to positively guide the tool during the cutting of the resin-passages, particularly when pulling upward the tool, the latter is provided with a bolt 23, which passes through a hole 22 of the shaft 3 and is turned off at a right angle as shown at 24 and provided with a pair of rollers or wheels 25 or the like, which are adapted to rock round the axis of the bent part 24. Springs 26 are arranged on the bolt 23 at both sides of the shaft 3 and provide for a resilient location of said bolt. In view of the fact that the rollers or wheels 25 run on the outer face of the bark or sap-face, the tool is securely guided and any roughness of the running face is compensated by the movability of the wheels or rollers 25. Thus this guiding device can readily move in any direction in view of the fact that the bolt 23 rotates in the bore 22 and can resiliently move in its axial direction.

When working out resin-passages from the top downward, the tool is pulled downward in the direction of the arrow *a* by holding it by the grip 1. If the tool is pushed upward for working out resin-passages, the shaft 3 is provided with a rest for the hand, which comprises a U-shaped sheet metal member 27, fixed to the bolt 4 at any convenient position, which passes through a longitudinal slot 28 of said member 27. The latter may be provided with an extension 29 which serves as guide for the tool by resting on or following up the sap-face during operation.

I claim:—

1. Tree-planer for working out and cutting resin-passages in trees, comprising a shaft, a U-shaped plane-iron carried by said shaft, a universally adjustable tongue embraced by the said plane iron and disposed in the cutting direction and in back of the cutting edge of the plane iron, the cutting depth depending on the adjustment of the said tongue.

2. Tree-planer as claimed in claim 1 comprising a resilient and universally adjustable pair of rotary members mounted on the shaft and disposed in the direction of movement of the tool in front of the plane-iron for guiding the tool.

3. Tree-planer as claimed in claim 1 comprising a rest provided with an extension which faces the sap-face of the tree and rests on the latter during operation.

4. A tree planer as claimed in claim 1, comprising a plane iron provided with two arms, a universally adjustable carrier attached to said arms, said tongue being movable on and supported by said carrier, a stop on said carrier to lock the rear end of the said tongue in working position.

5. A tree planer as claimed in claim 1, comprising a guide in front of and in back of said shaft, the guide in back of the plane iron being provided with an extension piece following up the sapwood.

6. A tree planer as claimed in claim 1, comprising a guide in front of the said shaft and an adjustable and resilient guiding roller on each side of the said guide.

In testimony whereof I affix my signature.

WALTER BARK.